(12) United States Patent
Zhang et al.

(10) Patent No.: US 12,289,647 B2
(45) Date of Patent: Apr. 29, 2025

(54) MEASUREMENT GAP CONFIGURATION FOR BANDWIDTH PART SWITCHING

(71) Applicant: Apple Inc., Cupertino, CA (US)

(72) Inventors: Dawei Zhang, Saratoga, CA (US); Yang Tang, Santa Clara, CA (US); Jie Cui, Cupertino, CA (US); Xiang Chen, Campbell, CA (US); Manasa Raghavan, Sunnyvale, CA (US); Huaning Niu, San Jose, CA (US); Qiming Li, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,244

(22) PCT Filed: Jan. 14, 2021

(86) PCT No.: PCT/CN2021/071897
§ 371 (c)(1),
(2) Date: Sep. 20, 2021

(87) PCT Pub. No.: WO2022/151243
PCT Pub. Date: Jul. 21, 2022

(65) Prior Publication Data
US 2023/0362764 A1    Nov. 9, 2023

(51) Int. Cl.
*H04W 36/00*      (2009.01)
*H04W 24/10*      (2009.01)
(Continued)

(52) U.S. Cl.
CPC ....... *H04W 36/0088* (2013.01); *H04W 24/10* (2013.01); *H04W 36/0058* (2018.08);
(Continued)

(58) Field of Classification Search
CPC . H04W 16/24; H04W 24/10; H04W 36/0058; H04W 36/0085; H04W 36/0088;
(Continued)

(56) References Cited

U.S. PATENT DOCUMENTS

| | | | |
|---|---|---|---|
| 2012/0178465 A1* | 7/2012 | Lin | H04W 24/10 455/450 |
| 2015/0245235 A1* | 8/2015 | Tang | H04W 24/10 370/252 |

(Continued)

FOREIGN PATENT DOCUMENTS

| | | |
|---|---|---|
| CN | 109803304 A | 5/2019 |
| CN | 110012498 A | 7/2019 |

(Continued)

OTHER PUBLICATIONS

International Search Report for Application No. PCT/CN2021/071897, mailed Oct. 15, 2021.
(Continued)

*Primary Examiner* — San Htun
(74) *Attorney, Agent, or Firm* — Sterne, Kessler, Goldstein & Fox P.L.L.C.

(57) ABSTRACT

Some aspects of this disclosure relate to apparatuses and methods for implementing techniques for generating a report result based on a set of measurements performed at measurement gaps during a reporting period. The set of measurements are performed on a reference signal at a first bandwidth part (BWP) or a second BWP when BWP switching is performed. The first BWP has a first measurement gap configuration, the second BWP has a second measurement gap configuration. The measurement gaps of the reporting period are configured according to a third measurement gap
(Continued)

configuration that is determined based on the first measurement gap configuration and the second measurement gap configuration.

20 Claims, 6 Drawing Sheets

(51) Int. Cl.
*H04W 56/00* (2009.01)
*H04W 68/02* (2009.01)
*H04W 84/02* (2009.01)

(52) U.S. Cl.
CPC ........ *H04W 56/0065* (2013.01); *H04W 68/02* (2013.01); *H04W 84/02* (2013.01)

(58) Field of Classification Search
CPC ......... H04W 36/0094; H04W 56/0065; H04W 88/00–06; H04W 16/14; H04W 16/28; H04W 76/20–28; H04W 84/02–027; H04W 88/185
See application file for complete search history.

(56) References Cited

U.S. PATENT DOCUMENTS

| | | | | |
|---|---|---|---|---|
| 2018/0091212 A1* | 3/2018 | Lee | ...................... | H04B 7/0695 |
| 2019/0075585 A1* | 3/2019 | Deogun | ............ | H04W 72/1273 |
| 2019/0124533 A1* | 4/2019 | Tenny | .................... | H04L 5/0091 |
| 2019/0174341 A1* | 6/2019 | Chincholi | ............ | H04B 17/336 |
| 2019/0373496 A1 | 12/2019 | Cui et al. | | |
| 2020/0204332 A1 | 6/2020 | Da et al. | | |
| 2020/0288337 A1* | 9/2020 | Callender | ............. | H04W 24/10 |
| 2020/0403761 A1* | 12/2020 | Nguyen | ................ | H04L 5/0094 |
| 2022/0104059 A1 | 3/2022 | Hu et al. | | |
| 2023/0337029 A1* | 10/2023 | Tang | ..................... | H04W 24/10 |

FOREIGN PATENT DOCUMENTS

| | | |
|---|---|---|
| EP | 3 713 332 A1 | 9/2020 |
| WO | WO 2019/037506 A1 | 2/2019 |
| WO | WO 2020/248261 A1 | 12/2020 |

OTHER PUBLICATIONS

Intel Corporation, "Measurement Gap Enhancement," 3GPP TSG-RAN WG4 Meeting #88, Gothenburg, Sweden, Aug. 20-24, 2017, R4-1809871, 6 pages.

Extended European Search Report directed to European Patent Application No. 21918451.2, mailed Sep. 12, 2024; 16 pages.

Apple, "Work plan for measurement gap enhancement," 3GPP TSG-RAN4 Meeting #97-e, R4-2014224, Nov. 2, 2020; 4 pages. Best Available Date: Nov. 2-13, 2020.

* cited by examiner

MEASUREMENT GAP CONFIGURATION FOR BANDWIDTH PART SWITCHING

This application is a U.S. National Phase of International Application No. PCT/CN2021/071897, filed Jan. 14, 2021, which is hereby incorporated by reference in its entirety.

BACKGROUND

Field

The described aspects generally relate to bandwidth part switching in wireless communication and measurement gap configuration related to switching bandwidth part.

Related Art

The 3rd Generation Partnership Project (3GPP) has developed a new radio-access technology known as fifth generation (5G) New Radio (NR). One of the goals of 5G NR is to have flexible carrier size to enable spectrum flexibility, e.g. the capability to support a user equipment (UE) utilizing a carrier bandwidth (BW) part (BWP) smaller than the carrier BW serving the network cell. BWPs enable UEs to be configured to operate in BWs that are narrower than the carrier BW, using customized numerologies and BW sizes fitting the service requirements in terms of throughput, delay and energy efficiency. A UE can have multiple BWPs in a carrier supported in a network cell. Radio resource management (RRM) is the system level management for a multi-user and multi-cell network on co-channel interference, radio resources, and other radio transmission characteristics in wireless communication systems. The use of BWPs for a UE can cause more complexity for RRM.

SUMMARY

Some aspects of this disclosure relate to apparatuses and methods for implementing radio resource management (RRM) techniques for a user equipment (UE) to generate a report result based on a set of measurements performed at measurement gaps during a reporting period. The set of measurements can be performed on a different bandwidth (BW) part (BWP) after switching BWP for a UE. The measurement gaps at which the set of measurements are performed are configured based on a measurement gap configuration determined by mechanisms illustrated in this disclosure based on the previously configured measurement gap configurations for individual BWPs.

Some aspects of this disclosure relate to a UE. The UE can include transceiver configured to wirelessly communicate with a base station, and a processor communicatively coupled to the transceiver. The processor of the UE is configured to determine a first measurement gap configuration for a first bandwidth part (BWP) of a first frequency layer of a carrier supported by a cell that serves the UE and base station, and a second measurement gap configuration for a second BWP of a second frequency layer of the carrier. In some examples, the cell can be a primary cell or a secondary cell. The first BWP or the second BWP can be an initial BWP, a first active BWP, a default BWP, or a dedicated BWP. The first measurement gap configuration can include a first measurement gap repetition period for the first BWP, while the second measurement gap configuration can include a second measurement gap repetition period for the second BWP.

Afterwards, the processor is configured to determine a third measurement gap configuration for the first BWP and the second BWP, based on the first measurement gap configuration and the second measurement gap configuration. According to some aspects, the third measurement gap configuration can include a reporting period for generating a report result about the carrier. The third measurement gap configuration can further include a third measurement gap repetition period. The first measurement gap repetition period, the second measurement gap repetition period, and the third measurement gap repetition period can be 5 ms, 10 ms, 20 ms, 40 ms, 80 ms, 160 ms, or some other time period. In some examples, the processor can be configured to receive the third measurement gap configuration from the base station, and determine the third measurement gap configuration based on the received third measurement gap configuration.

In addition, the processor can be configured to perform a first set of measurements on a reference signal operating in the first BWP based on the third measurement gap configuration starting from a first time instance. In some examples, the first frequency layer is an active frequency layer, and the first set of measurements on the reference signal at the first BWP is measured without being at a measurement gap. In some examples, the reference signal is a synchronizations block (SSB) including Synchronization Signal based Reference Signal Received Power (SS-RSRP), Synchronization Signal based Reference Signal Received Quality (SS-RSRQ), Synchronization Signal based Signal to Noise and Interference Ratio (SS-SINR), Synchronization Signal based Signal to Noise and Interference Ratio (SS-SINR), or Received (linear) average power of the resource elements that carry NR SSB signals and channels (SSB_RP).

Afterwards, the processor can be configured to switch from the first BWP to the second BWP at a second time instance that occurs after the first time instance. In some example, the switching from the first BWP to the second BWP can be triggered by a downlink control information (DCI), a radio resource control (RRC) signaling, a inactivity timer expiration, or a medium access control (MAC) entity upon initiation of random access procedure.

Furthermore, the processor can be configured to perform a second set of measurements on the reference signal during measurement gaps configured based on the third measurement gap configuration for the second BWP. Furthermore, the processor can be configured to generate the report result based on a third set of measurements performed during the reporting period, where the third set of measurements include at least the second set of measurements. After the report result is generated, the processor can be configured to transmit the report result to the base station.

According to some aspects, the reporting period can start from the first time instance when the first set of measurements is performed on the reference signal operating in the first BWP, and the third set of measurements can include the first set of measurements on the reference signal. Additionally and alternatively, the reporting period can start from the second time instance, and the report result is generated without the first set of measurements. The processor can be configured to generate the report result based on an average value of the third set of measurements performed during the reporting period.

According to some aspects, the third measurement gap configuration for the first BWP is same as the first measurement gap configuration, and the third measurement gap configuration for the second BWP is same as the second measurement gap configuration. Additionally and alternatively, the first measurement gap configuration includes a first measurement gap repetition period for the first BWP, the second measurement gap configuration includes a second measurement gap repetition period for the second BWP. A third measurement gap repetition period is selected as a longer measurement gap repetition period of the first measurement gap repetition period and the second measurement gap repetition period, and the third measurement gap configuration includes the third measurement gap repetition period for the first BWP and the second BWP.

According to some aspects, the reference signal is a first reference signal, the carrier is a first carrier, the report result is a first report result, and the processor is further configured to perform a fourth set of measurements on a second reference signal at a third frequency layer of a second carrier during measurement gaps configured according to the third measurement gap configuration for the first BWP before switching from the first BWP to the second BWP. In this case, the third measurement gap configuration includes the reporting period for generating the first report result about the first carrier, and generating a second report result about the second carrier. The processor is further configured to perform a fifth set of measurements on the second reference signal at the third frequency layer of the second carrier during measurement gaps configured according to the third measurement gap configuration for the second BWP after switching from the first BWP to the second BWP. Afterward, the processor is further configured to generate the second report result based the fourth set of measurements and the fifth set of measurements for the second carrier.

Some aspects of this disclosure relate to a method performed by a UE. The method includes determining a first measurement gap configuration for a first BWP of a first frequency layer of a carrier over a cell served by a base station, and a second measurement gap configuration for a second BWP of a second frequency layer of the carrier over the cell. The method further includes determining a third measurement gap configuration for the first BWP and the second BWP, based on the first measurement gap configuration and the second measurement gap configuration. The third measurement gap configuration includes a reporting period for generating a report result about the carrier over the cell to be sent to the base station. Furthermore, the method includes performing a first set of measurements on a reference signal at the first BWP based on the third measurement gap configuration starting from a first time instance; switching from the first BWP to the second BWP at a second time instance after the first time instance; and performing a second set of measurements on the reference signal during measurement gaps configured according to the third measurement gap configuration for the second BWP. Afterward, the method includes generating the report result based a third set of measurements performed during the reporting period, where the third set of measurements includes at least the second set of measurements. Moreover, the method includes transmitting the report result to the base station.

Some aspects of this disclosure relate to non-transitory computer-readable medium storing instructions. When executed by a processor of a UE, the instructions stored in the non-transitory computer-readable medium cause the UE to perform various operations. The operations include determining a first measurement gap configuration for a first BWP of a first frequency layer of a carrier over a cell served by the base station, and a second measurement gap configuration for a second BWP of a second frequency layer of the carrier over the cell. The operations also include determining a third measurement gap configuration for the first BWP and the second BWP, based on the first measurement gap configuration and the second measurement gap configuration. The third measurement gap configuration includes a reporting period for generating a report result about the carrier over the cell to be sent to the base station. The operations further include performing a first set of measurements on a reference signal at the first BWP based on the third measurement gap configuration starting from a first time instance; switching from the first BWP to the second BWP at a second time instance after the first time instance; and performing a second set of measurements on the reference signal during measurement gaps configured according to the third measurement gap configuration for the second BWP. In addition, the operations include generating the report result based a third set of measurements performed during the reporting period, where the third set of measurements include at least the second set of measurements; and transmitting the report result to the base station.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In the fifth generation (5G) New Radio (NR) technology, a user equipment (UE) can use a bandwidth (BW) part (BWP), which is smaller than the carrier BW utilized in the network cell, to have a flexible carrier size to enable spectrum flexibility. A BWP includes a group of contiguous physical resource blocks (PRB) in a frequency layer on a carrier in a serving cell that uses some given numerology (i.e., a subcarrier spacing and a cyclic prefix overhead). A UE can have multiple BWPs defined in a serving cell. BWP switching is a procedure that simultaneously activate an inactive BWP (e.g. dedicated BWP) while deactivate an active BWP (e.g. default BWP).

Radio resource management (RRM) is a system level management for a multi-user and multi-cell network on co-channel interference, radio resources, and other radio transmission characteristics in wireless communication systems. For operations such as handover to a neighbor cell, or adding a new component carrier (CC) in carrier aggregation (CA), it is useful to measure cell quality, such as synchronizations block (SSB) in the active BWP in the serving cell, or a reference signal received power (RSRP) or reference signal received quality (RSRQ) for neighbor cells. In some examples, a radio frequency (RF) module is used to perform measurements of reference signals, and to transmit and receive data in the serving cell. Hence, data cannot be transmitted or received in the serving cell during measurements of reference signals of the cells or CCs of different frequencies. A measurement gap is defined as the time period when data transmission in the serving cell is suspended on the UE to give the UE an opportunity to measure cells and CCs with a different frequency. A measurement gap can be defined for a UE on a BWP by a measurement gap configuration, which is normally preconfigured, e.g., by a Radio Resource Control (RRC) signaling.

The use of BWPs for a UE can cause more complexity for RRM issues, e.g., measurement gap configuration. When BWP switching occurs, the actual measurement gap patterns configured by a measurement gap configuration may be changed from the preconfigured measurement gap configuration on individual BWPs.

Some aspects of this disclosure provide mechanisms to determine the measurement gap configuration in the context of BWP switching. A UE can have a preconfigured first measurement gap configuration for a first BWP of a first frequency layer of a carrier over a cell, and a second measurement gap configuration for a second BWP of a second frequency layer of the carrier. The first measurement gap configuration can be different from the second measurement gap configuration. When a BWP switching happens, there is a need to determine what kind of measurement gap configuration to be used in both the first BWP and the second BWP. In some embodiments, the UE can determine to use a third measurement gap configuration for the first BWP and the second BWP before and after BWP switching. In some examples, the third measurement gap configuration for the first BWP can be the same as the first measurement gap configuration, and the third measurement gap configuration for the second BWP can be the same as the second measurement gap configuration. In some other examples, the third measurement gap configuration for the first BWP can be different from the first measurement gap configuration, or the third measurement gap configuration for the second BWP can be different from the second measurement gap configuration. For example, when the first measurement gap configuration includes a first measurement gap repetition period for the first BWP, the second measurement gap configuration includes a second measurement gap repetition period for the second BWP, the third measurement gap configuration can have a third measurement gap repetition period selected as a longer measurement gap repetition period of the first measurement gap repetition period and the second measurement gap repetition period.

In addition, performing measurements is only a part of the process for RRM. A report of measurement results can be sent to the base station so that the base station can make determinations related to the RRM process. The third measurement gap configuration can include a reporting period for generating a report result about the carrier, where only the measurements performed during the reporting period are used to generate the report result. In detail, a UE can perform a first set of measurements on a reference signal operating in the first BWP based on the third measurement gap configuration starting from a first time instance. The UE can further perform a second set of measurements on the reference signal during measurement gaps configured based on the third measurement gap configuration for the second BWP, after switching from the first BWP to the second BWP. The UE can further generate the report result based on a third set of measurements performed during the reporting period, wherein the third set of measurements include at least the second set of measurements; and transmit the report result to the base station.

Figure 1:
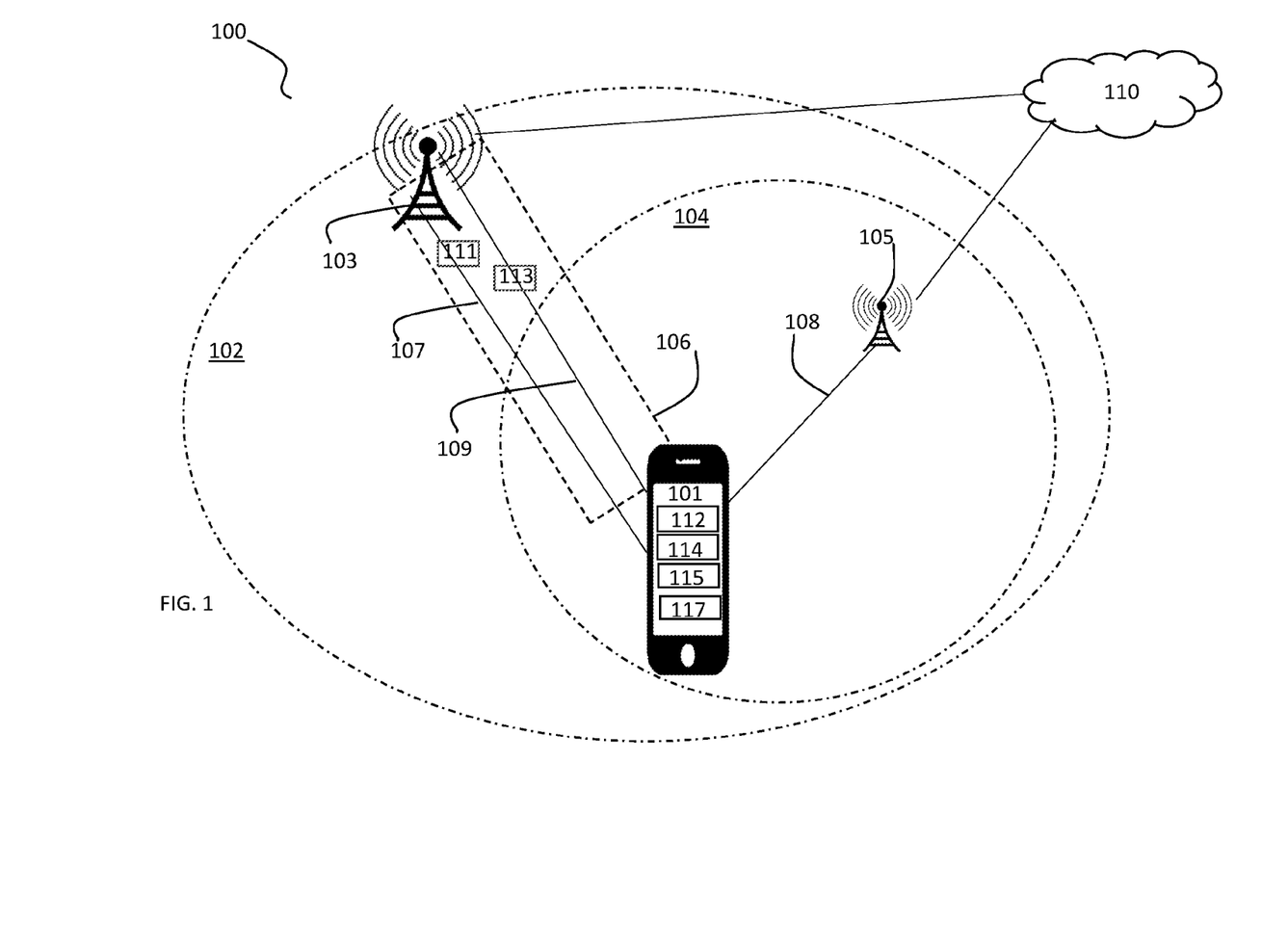
FIG. 1 illustrates a wireless system including a user equipment (UE) to generate a report result during a reporting period on a set of measurements performed on a reference signal based on a measurement gap configuration on a first bandwidth part (BWP) and a second BWP, according to some aspects of the disclosure.
Figure 2:
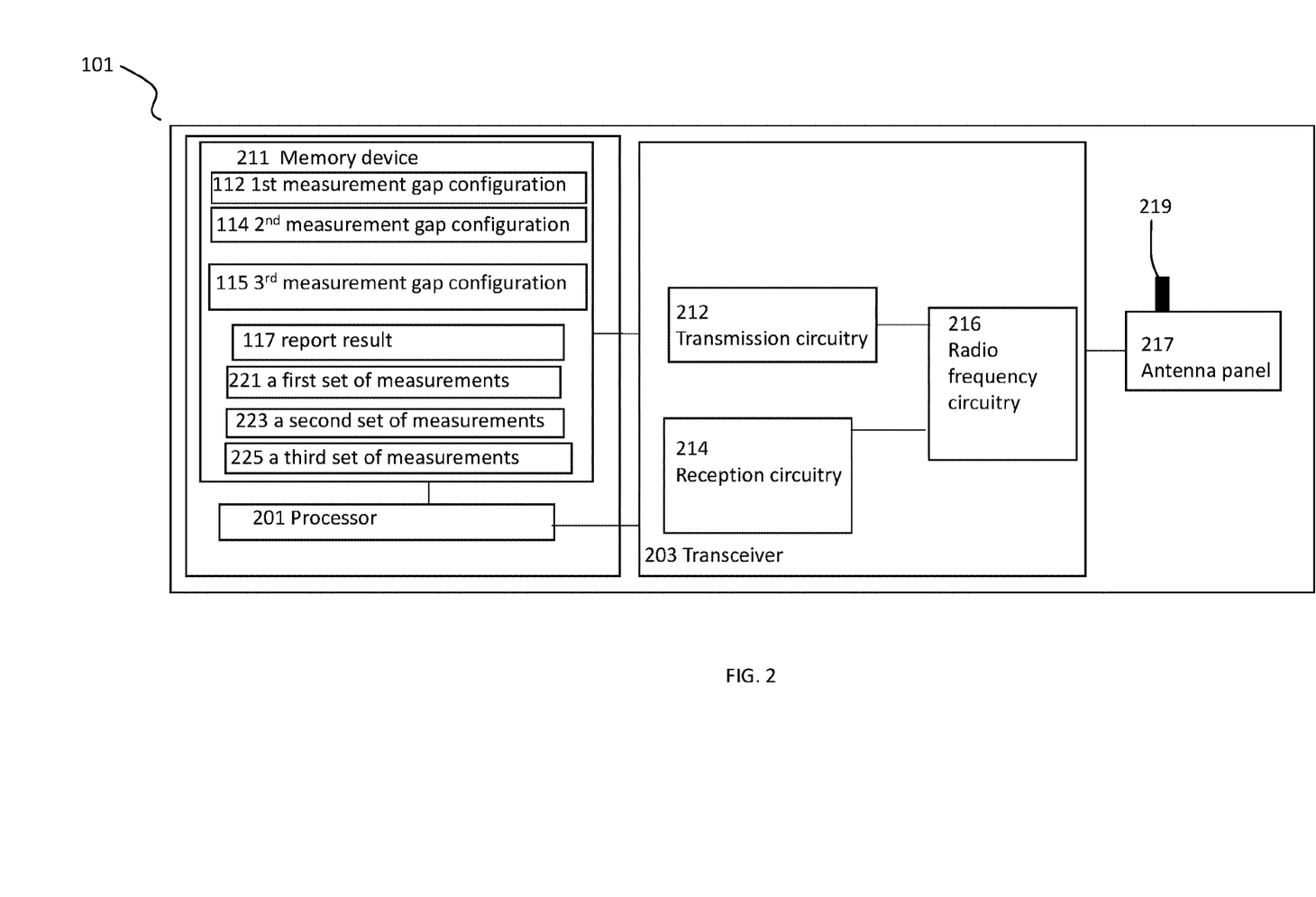
FIG. 2 illustrates a block diagram of a UE to perform functions described herein, according to some aspects of the disclosure.

FIG. 1 illustrates a wireless system 100 including a UE, e.g., UE 101, to generate a report result 117 during a reporting period on a set of measurements performed on a reference signal based on a measurement gap configuration 115 on a first BWP and a second BWP, according to some aspects of the disclosure. Measurement gap configuration 115 is determined based on some preconfigured measurement gap configurations, e.g., a first measurement gap configuration 112 for the first BWP and a second measurement gap configuration 114 for the second BWP. FIG. 2 illustrates a block diagram of a UE, e.g., UE 101, to perform functions described herein, according to some aspects of the disclosure. Wireless system 100 is provided for the purpose of illustration only and does not limit the disclosed aspects. Wireless system 100 can include, but is not limited to, UE 101, base station 103, and a base station 105, all communicatively coupled to a core network 110. UE 101 communicates with base station 103 over a carrier 106 including a frequency layer 107 and a frequency layer 109, and communicates with base station 105 over a frequency layer 108 of a carrier.

In some examples, wireless system 100 can be a NR-U system, a LTE system, a 5G system, or some other wireless system. There can be other network entities, e.g., network controller, a relay station, not shown. Wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103 and base station 105 can be a fixed station or a mobile station. Base station 103 and base station 105 can also be called other names, such as a base transceiver system (BTS), an access point (AP), a transmission/reception point (TRP), an evolved NodeB (eNB), a next generation node B (gNB), a 5G node B (NB), or some other equivalent terminology. In some examples, base station 103 and base station 105 can be interconnected to one another and/or to other base station or network nodes in a network through various types of backhaul interfaces such as a direct physical connection, a virtual network, and/or the like, not shown.

According to some aspects. UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 103 and base station 105 can be communicatively coupled to core network 110. Base station 103 can serve a cell 102, while base station 105 can serve a cell 104 contained within cell 102. In some other embodiments, cell 102 can overlap partially with cell 104. Cell 102 or cell 104 can be a macro cell, a pico cell, a femto cell, and/or another type of cell. In comparison, a macro cell can cover a relatively large geographic area, e.g., several kilometers in radius, a femto cell can cover a relatively small geographic area. e.g., a home, while a pico cell covers an area smaller than the area covered by a macro cell but larger than the area covered by a femto cell. For example, cell 102 can be a macro cell, while cell 104 can be a pico cell or a femto cell. In addition, cell 102 can be a pico cell and cell 104 can be a femto cell. In some examples, the geographic area of a cell can move according to the location of a mobile base station.

According to some aspects, base station 103 can be the serving base station and cell 102 can be the serving cell or primary cell. Cell 104 can be a secondary cell, or a primary secondary cell. There can be other secondary cells for UE 101, not shown. Data for UE 101 can be simultaneously transferred between UE 101 and core network 110 by a radio connection between UE 101 and base station 103 at one carrier frequency (component carrier, e.g., frequency layer 107 or frequency layer 109 of carrier 106), and one or more radio connections between UE 101 and base station 105 at different carrier frequencies (component carriers, e.g., frequency layer 108).

According to some aspects, UE 101 can communicate with base station 103 in one or more BWPs of carrier 106, e.g., a BWP 111 in frequency layer 107, and a BWP 113 in frequency layer 109. A BWP for UE 101 at carrier 106 can be smaller than the BW of carrier 106 to have a flexible carrier size to enable spectrum flexibility. A BWP, e.g., BWP 111 or BWP 113, includes a group of contiguous physical resource blocks (PRB) in a frequency layer of a carrier in a serving cell that uses some given numerology (e.g., a subcarrier spacing and a cyclic prefix overhead). In some example, UE 101 can operate in BWP 111 at frequency layer 107, and BWP 113 at frequency layer 109. BWP 111 and BWP 113 can have a size varying from 24 to 275 PRBs, or some other sizes.

According to some aspects, there can be more than one BWP in a frequency layer or a carrier, e.g., 4 downlink (DL) BWPs and 4 uplink (UL) BWPs configured to UE 101 on cell 102. Only one DL and one UL BWP can be active at a given time in a serving cell. BWP 111 or BWP 113 can be an initial BWP, a first active BWP, a default BWP, or a dedicated BWP. An initial BWP is common to all UEs, which is to be used for initial access, until UE receives BWP cell configuration. An initial BWP can have a size of about 24, 48, or 96 PRBs. A first active BWP is a BWP activated upon RRC configuration or MAC activation of a secondary cell. A default BWP is activated upon the expiration of the BWP inactivity timer. Default BWP can occupy the same PRBs as the initial BWP, and a UE is expected to stay in the default BWP until traffic demands increase. A dedicated BWP is a regular BWP configured in a dedicated manner, which is usually wider than the default BWP to allow transmission of higher traffic loads.

BWP switching is a procedure that simultaneously activates an inactive BWP (e.g. dedicated BWP) while deactivating an active BWP (e.g. default BWP). BWP switching can be triggered via downlink control information (DCI), RRC signaling, BWP inactivity timer expiration, or by MAC entity upon initiation of random access (RA) procedure. RRC/MAC BWP switching allows configuring a new BWP to be activated as well as activating an already configured BWP. Switching the BWPs using DCI command allows activating preconfigured BWPs, which enables faster switching.

For network operations such as handover to a neighbor cell, or adding a new component carrier (CC) in carrier aggregation (CA), it is desirable to measure cell quality, such as reference signal received power (RSRP) or reference signal received quality (RSRQ) for neighbor cells or cell quality of the serving cell. UE 101 can perform various measurements and generate a report containing report result 117 based on the measurements performed. Such a report result, e.g., report result 117, can help UE 101 or base station 103 to manage network operations to be performed appropriately, maintaining radio link quality. With NR, the cell quality can be measured by using SS/PBCH blocks (SSB). These are composed of a synchronization signal (SS) and the physical broadcast Channel (PBC). The SSB periodicity can be configured for each cell, in the range of 5, 10, 20, 40, 80, or 160 ms.

In some embodiments, UE 101 does not need to measure cell quality with the same periodicity as the SSB and the appropriate periodicity can be configured accordingly to the channel condition. SSB-based RRM measurement timing configuration window (SMTC window) is used to notify UE 101 of the periodicity and timing of SSBs that UE 101 can use for measurements. The SMTC window periodicity can be set in the same range as the SSB, of 5, 10, 20, 40, 80, or 160 ms, and the duration of the window can be set to 1, 2, 3, 4, or 5 ms, according to the number of SSBs transmitted on the cell being measured.

According to some aspects, UE 101 can measure a reference signal. In some example, the reference signal can be a synchronizations block (SSB) including Synchronization Signal based Reference Signal Received Power (SS-RSRP), Synchronization Signal based Reference Signal Received Quality (SS-RSRQ), Synchronization Signal based Signal to Noise and Interference Ratio (SS-SINR), Synchronization Signal based Signal to Noise and Interference Ratio (SS-SINR), or Received (linear) average power of the resource elements that carry NR SSB signals and channels (SSB_RP).

FIG. 2 illustrates a block diagram of UE 101, having antenna panel 217 including one or more antenna elements, e.g., an antenna element 219 coupled to transceiver 203 and controlled by processor 201. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 201 can be communicatively coupled to a memory device 211, which can be further coupled to the transceiver 203. Processor 201, alone or in combination with instructions in memory device 211 and the transceiver 203, can perform or cause to per perform, the measurement gap functionality as described herein.

In some examples, RF circuitry 216 is used by UE 101 to perform measurements of reference signals, and to transmit and receive data in the serving cell. Hence, data cannot be transmitted or received in the serving cell, e.g., cell 102, during measurements of reference signals of the cells or CCs of different frequencies. A measurement gap is defined as the time period when data transmission in cell 102 is suspended on UE 101 to give UE 101 an opportunity to measure cells and CCs with a different frequency. A measurement gap can be defined for UE 101 on a BWP by a measurement gap configuration, which can be preconfigured, e.g., by a RRC signaling.

In some examples, memory device 211 can store the first measurement gap configuration 112 for BWP 111 of frequency layer 107 of carrier 106 supported by cell 102 that serves UE 101 and base station 103. In addition, memory device 211 can store the second measurement gap configuration 114 for BWP 113 of frequency layer 109 of carrier 106. According to some aspects, UE 101 or processor 201 can be configured to receive the first measurement gap configuration 112 and the second measurement gap configuration 114 from base station 103. The first measurement gap configuration 112 can include a first measurement gap repetition period for BWP 111, and the second measurement gap configuration 114 can include a second measurement gap repetition period for BWP 113. The first measurement gap repetition period for BWP 111 and the second measurement gap repetition period for BWP 113 can be the same or different. A measurement gap repetition period. e.g., the first measurement gap repetition period or the second measurement gap repetition period, can be 5 ms, 10 ms, 20 ms, 40 ms, 80 ms, or 160 ms, similar to a SMTC window.

UE 101 can perform a set of measurements on a reference signal, e.g., a reference signal operating in BWP 111 based on the first measurement gap configuration 112. Similarly, UE 101 can perform a set of measurements on the reference signal of BWP 111 when UE 101 is in a measurement gap at BWP 113 based on the second measurement gap configuration 114. When frequency layer 107 is an active frequency layer, UE 101 can perform a set of measurements on the reference signal SSB at active BWP 111 without UE 101 being at a measurement gap.

When BWP switching occurs from BWP 111 to BWP 113, measurement gaps used to measure a reference signal can be changed from measurement gaps configured according to the first measurement gap configuration 112 to measurement gaps configured according to the second measurement gap configuration 114. Depending on the relationship between the first measurement gap configuration 112 and the second measurement gap configuration 114, there can be various ways to perform measurements on the reference signals before and after the switching from BWP 111 to BWP 113.

According to some aspects, UE 101 can determine a third measurement gap configuration 115 for BWP 111 and BWP 113, based on the first measurement gap configuration 112 and the second measurement gap configuration 114. The third measurement gap configuration 115 for BWP 111 and BWP 113 can be received by UE 101 from base station 103, or determined by UE 101 based on measurement gap configuration 112 and measurement gap configuration 114. The third measurement gap configuration 115 is determined so that measurements of reference signals can be consistently performed after the BWP switching. Without BWP switching, there may not be needed to determine the third measurement gap configuration 115, but to rely on the two preconfigured measurement gap configurations, e.g., the first measurement gap configuration 112 and the second measurement gap configuration 114.

In some examples, when the first measurement gap repetition period for the first measurement gap configuration 112 on BWP 111 and the second measurement gap repetition period for the second measurement gap configuration 114 on BWP 113 is the same, the third measurement gap configuration 115 for BWP 111 can be the same as the first measurement gap configuration 112 for BWP 111, and the third measurement gap configuration 115 for BWP 113 can be same as the second measurement gap configuration 114 for BWP 113. In other words, the third measurement gap configuration 115 on different BWPs, e.g., BWP 111 and BWP 113, can be the same as previously configured the first measurement gap configuration 112 and the second measurement gap configuration 114 in corresponding BWPs.

In some other examples, the third measurement gap configuration 115 for BWP 111 can be different from the first measurement gap configuration 112, or the third measurement gap configuration 115 for BWP 113 can be different from the second measurement gap configuration 114. When the first measurement gap configuration 112 has a first measurement gap repetition period for BWP 111, and the second measurement gap configuration 114 has a second measurement gap repetition period for BWP 113, the third measurement gap configuration 115 can be determined to have a third measurement gap repetition period selected as a longer measurement gap repetition period of the first measurement gap repetition period and the second measurement gap repetition period. The third measurement gap configuration 115 having the third measurement gap repetition period can be applied to both BWP 111 and BWP 113. In addition, the third measurement gap configuration 115 can include a reporting period for generating report result 117 about carrier 106 based on measurements performed.

According to some aspects, once the third measurement gap configuration 115 for BWP 111 and BWP 113 is determined, UE 101 can perform measurements based on the third measurement gap configuration 115 instead of the previously configured the first measurement gap configuration 112 and the second measurement gap configuration 114. In detail, UE 101 can perform a first set of measurements, e.g., a first set of measurements 221, on a reference signal operating in BWP 111 based on the third measurement gap configuration 115 starting from a first time instance. UE 101 can switch from BWP 111 to BWP 113 at a second time instance that occurs after the first time instance. Afterwards, UE 101 can perform a second set of measurements, e.g., a second set of measurements 223, on the reference signal during measurement gaps configured based on the third measurement gap configuration 115 for BWP 113. Furthermore, UE 101 can generate report result 117 based on a third set of measurements, e.g., a third set of measurements 225, performed during the reporting period. The third set of measurements 225 include at least the second set of measurements 223, but may or may not include the first set of measurements 221.

Figure 3:
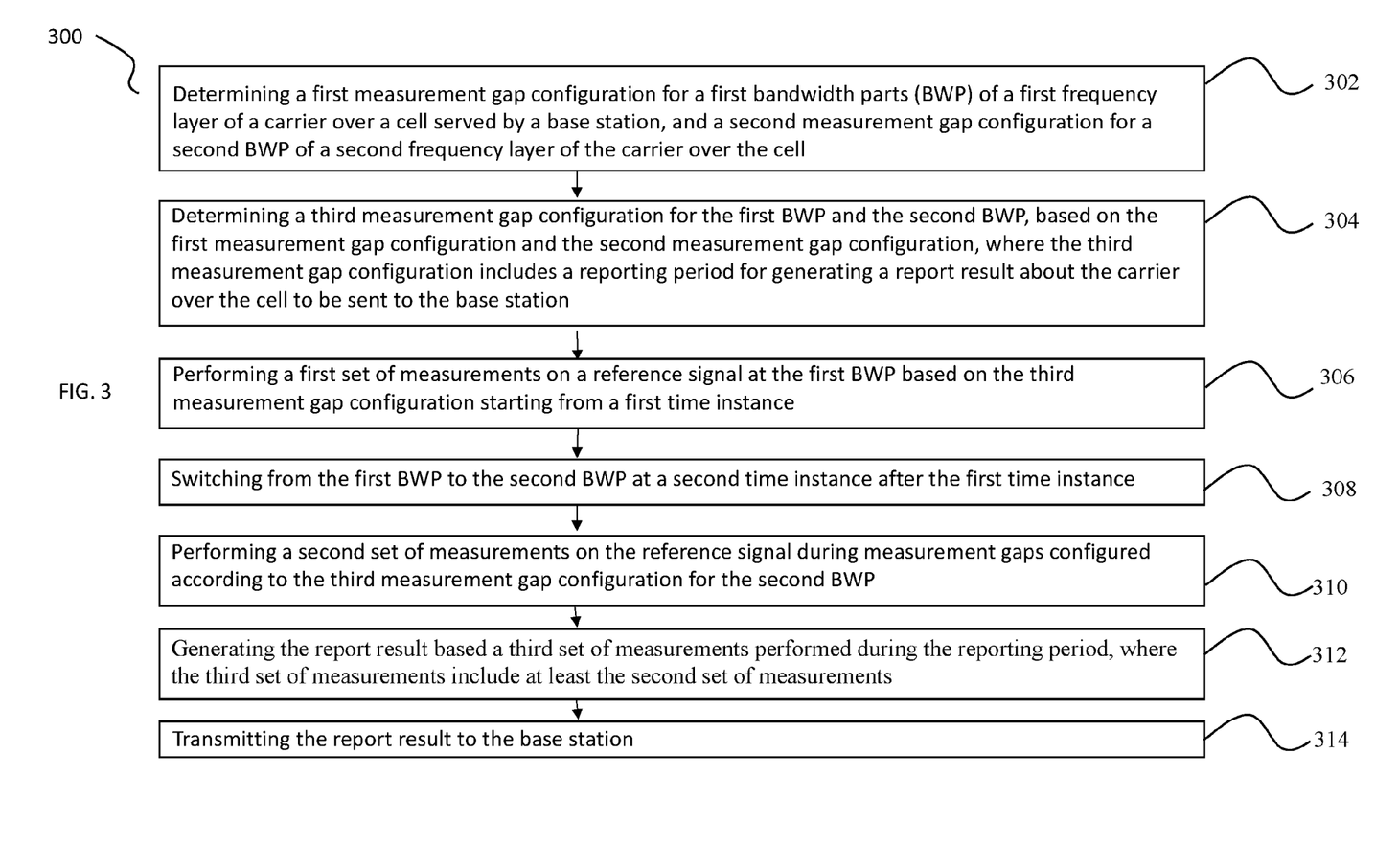
FIG. 3 illustrates an example method performed by a UE to generate a report result based on a set of measurements performed on a reference signal during a reporting period on a first BWP and a second BWP, according to some aspects of the disclosure.
Figure 4:
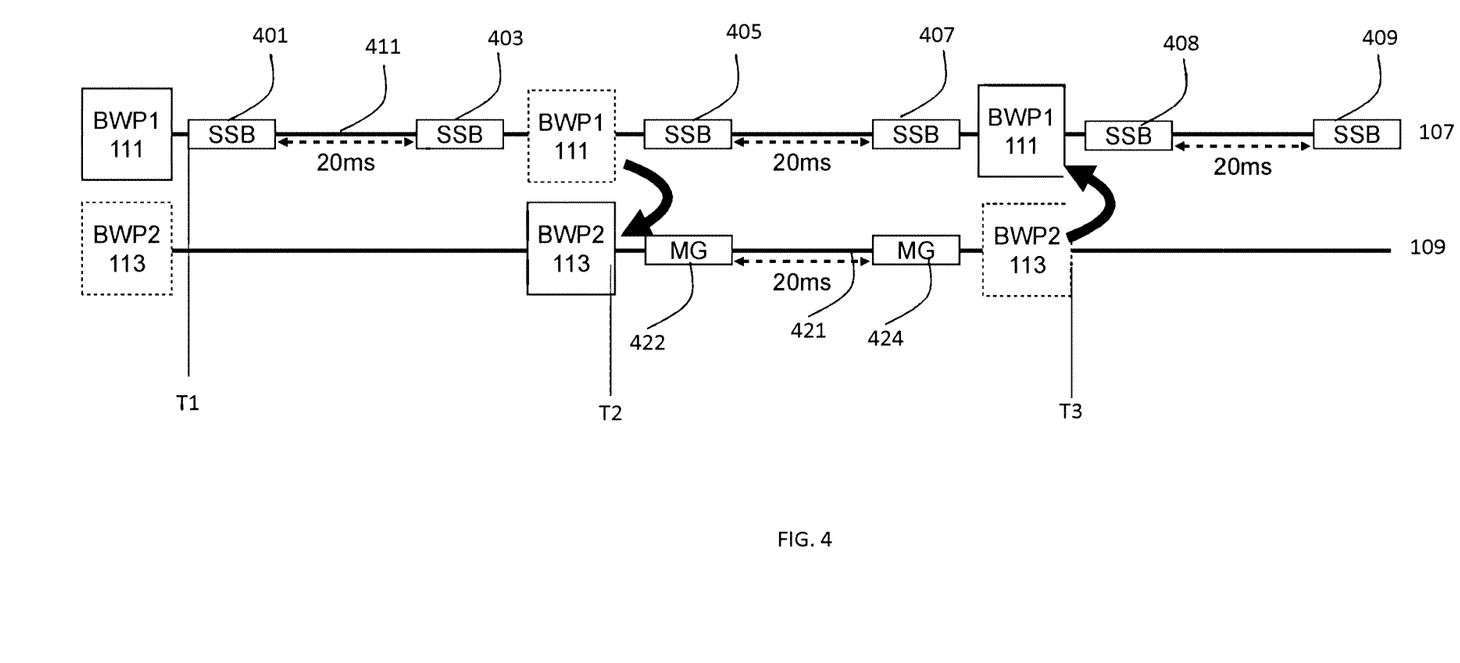
FIGS. 4-5 illustrate example measurement gap configurations determined by the UE to perform a set of measurements on a reference signal for generating a report result during a reporting period on a first BWP and a second BWP, according to some aspects of the disclosure.
Figure 5:
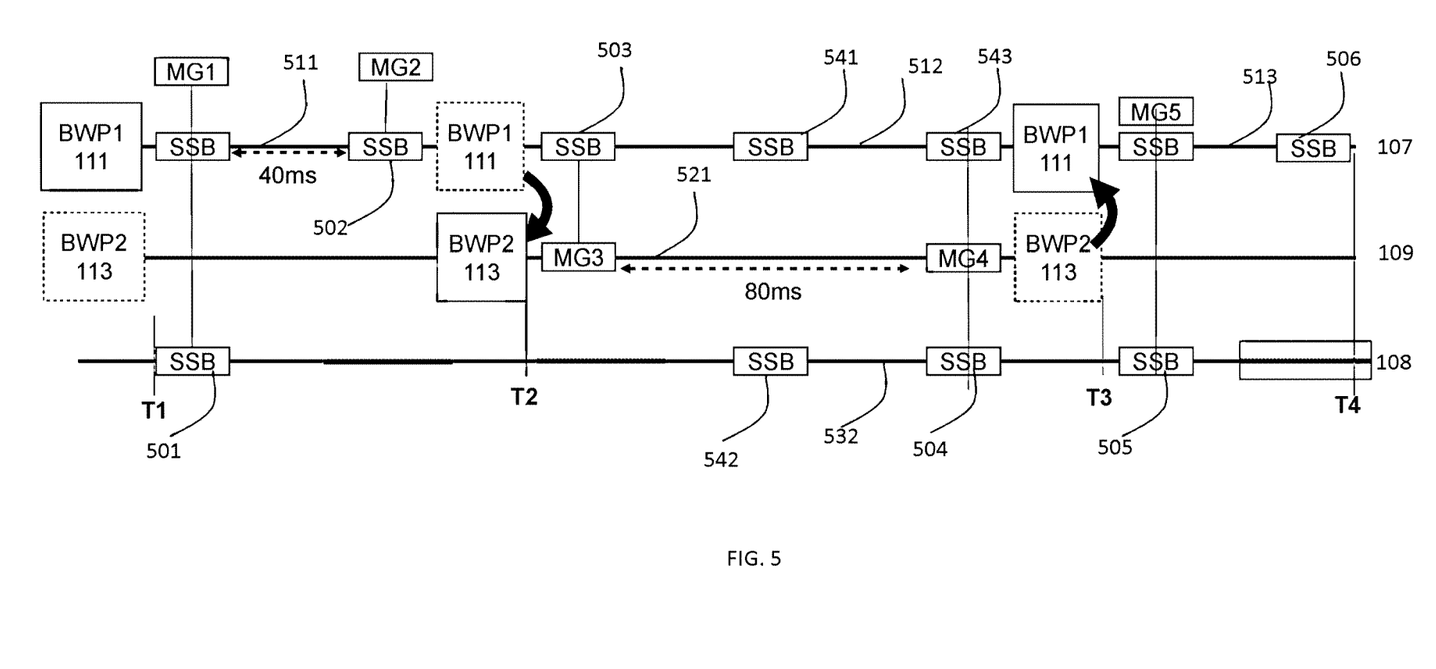

FIG. 3 illustrates an example method 300 performed by a UE to generate a report result based on a set of measurements performed during a reporting period on a first BWP and a second BWP, according to some aspects of the disclosure. FIGS. 4-5 illustrate example measurement gap configurations determined by the UE to perform a set of measurements on a reference signal for generating a report result during a reporting period on a first BWP and a second BWP, according to some aspects of the disclosure. Method 300 can be performed by UE 101 as shown in FIGS. 1-2.

At 302, UE 101 can determine a first measurement gap configuration for a first BWP of a first frequency layer of a carrier over a cell served by a base station, and a second measurement gap configuration for a second BWP of a second frequency layer of the carrier over the cell. For example, UE 101 can determine the first measurement gap configuration 112 for BWP 111, and the second measurement gap configuration 114 for BWP 113.

At 304. UE 101 can determine a third measurement gap configuration for the first BWP and the second BWP, based on the first measurement gap configuration and the second measurement gap configuration. The third measurement gap configuration can include a reporting period for generating a report result about the carrier over the cell to be sent to the base station. For example, UE 101 can determine the third measurement gap configuration 115 for BWP 111 and BWP 113, based on the first measurement gap configuration 112 and the second measurement gap configuration 114. Report result 117 can be generated based on measurements performed at measurement gaps configured according to the third measurement gap configuration 115. Details will be shown below for generating report result 117.

FIG. 4 illustrates an example for determining the third measurement gap configuration 115 based on the first measurement gap configuration 112 and the second measurement gap configuration 114. The first measurement gap configuration 112 for BWP 111 at frequency layer 107 has a first measurement gap repetition period 411, shown as 20 ms for example purposes. The first measurement gap repetition period 411 is the same as the SSB periodicity on BWP 111. A measurement gap repetition period, e.g., the first measurement gap repetition period 411, can also be referred to as a sampling rate for the samples of the reference signal, or a delay between two samples. The second measurement gap configuration 114 for BWP 113 at frequency layer 109 has a second measurement gap repetition period 421 of 20 ms between two measurement gaps, e.g., measurement gap 422 and measurement gap 424. Accordingly, the second measurement gap repetition period 421 of 20 ms is the same as the first measurement gap repetition period 411. Accordingly, the third measurement gap configuration 115 can have a measurement gap repetition period as 20 ms for both BWP 111 and BWP 113, which is the same as the first measurement gap configuration 112 and the second measurement gap configuration 114.

At 306, UE 101 can perform a first set of measurements on a reference signal at the first BWP based on the third measurement gap configuration starting from a first time instance. As shown in FIGS. 2 and 4, UE 101 can perform the first set of measurements 221 on a reference signal at BWP 111 based on the third measurement gap configuration starting from a first time instance T1. The first set of measurements 221 includes a sample 401 and a sample 403. In some examples, BWP 111 is an active BWP, sample 401 and sample 403 can be measured without UE 101 being in a measurement gap. Instead, sample 401 and sample 403 can be measured based on SSB periodicity.

At 308, UE 101 can switch from the first BWP to the second BWP at a second time instance that occurs after the first time instance. As shown in FIG. 4, UE 101 can switch from BWP 111 to BWP 113 at time instance T2. The switching from BWP 111 to BWP 113 is only for example. In some examples, there can be multiple BWP switches during a reporting period. For example, at time instance T3, UE 101 can switch from BWP 113 to BWP 111.

At 310, UE 101 can perform a second set of measurements on the reference signal during measurement gaps configured according to the third measurement gap configuration for the second BWP. As shown in FIG. 4, UE 101 can perform a second set of measurements 223 on a reference signal at BWP 111 based on the third measurement gap configuration 115 starting from a second time instance 12. The second set of measurements 223 includes a sample 405 and a sample 407, which are measured when UE 101 is at a measurement gap (MG) in BWP 113.

At 312, UE 101 can generate the report result based a third set of measurements performed during the reporting period, where the third set of measurements includes at least the second set of measurements. In some examples, the reporting period starts from the first time instance T1, and the third set of measurements includes the first set of measurements on the reference signal. As shown in FIG. 4, the reporting period can start from the first time instance T1, and ends at a time instance T3, where the third set of measurements 225 includes both the first set of measurements 221 and the second set of measurements 223. Hence, the third set of measurements 225 performed during the reporting period includes sample 401, sample 403, sample 405 and sample 407 of the corresponding SSBs. UE 101 is configured to generate report result 117 based on an average value of the third set of measurements performed during the reporting period, e.g., an average value of sample 401, sample 403, sample 405 and sample 407. In some examples, the reporting period can be referred to as a measurement period.

In some other examples, the reporting period can start from the second time instance T2, and the third set of measurements 225 includes the second set of measurements 223, but does not include the first set of measurements 221. Hence, the first set of measurements 221 is abandoned or disregarded for generating report result 117. Instead, report result 117 can be generated based on sample 405, sample 407, in addition to sample 408 and sample 409 performed after switching at T3 from BWP 113 to BWP 111. Report result 117 can be generated based on an average value of the third set of measurements performed during the reporting period, e.g., an average value of sample 405, sample 407, sample 408, and sample 409.

At 314, UE 101 can transmit the report result to the base station. For example, UE 101 can transmit report result 117 to base station 103.

Method 300 is illustrated above using FIG. 4 as a first example. In addition, FIG. 5 illustrates another example for method 300 to determine the third measurement gap configuration 115 based on the first measurement gap configuration 112 and the second measurement gap configuration 114. In some examples, the first measurement gap configuration 112 for BWP 111 at frequency layer 107 has a first measurement gap repetition period 511 between two measurement gaps (including MG1 and MG2) as 40 ms. The second measurement gap configuration 114 for BWP 113 at frequency layer 109 has a second measurement gap repetition period 521 between two measurement gaps as 80 ms, which is different from the first measurement gap repetition period 511. The third measurement gap configuration 115 can have various options responsive to the differing measurement gap repetition periods for the BWPs 111,113. In some examples, the third measurement gap configuration 115 can have a measurement gap repetition period selected as a longer one of the first measurement gap repetition period 511 and the second measurement gap repetition period 521. In this case, the third measurement gap configuration 115 can have a measurement gap repetition period as 80 ms, both before and after the switching from BWP 111 to BWP 113 at time instance T2. In some other examples, the third measurement gap configuration 115 can have a measurement gap repetition period selected as a shorter one of the first measurement gap repetition period 511 and the second measurement gap repetition period 521, e.g., 40 Ms.

Furthermore, in some other examples, the third measurement gap configuration 115 can have a measurement gap repetition period that is the same as repetition period 511 for BWP 111, and the third measurement gap configuration 115 can have a measurement gap repetition period that is the same as repetition period 521 for BWP 113. In other words, the third measurement gap configuration 115 performs the same as the first measurement gap configuration 112 for BWP 111, and performs the same as the second measurement gap configuration 114 for BWP 113.

As shown in FIG. 5, measurement gaps configured based on the third measurement gap configuration 115 are used to measure a first reference signal, e.g., SSB signal at BWP 111 of frequency layer 107 of carrier 106, and further measure a second reference signal, e.g., SSB signal at frequency layer 108 of a different carrier. The SSB signal at BWP 111 has a SSB periodicity 512, which is the delay between two SSB samples 541 and 543. The SSB signal at frequency layer 108 has a SSB periodicity 532 between samples 542 and 504. As shown, SSB periodicity 512 and SSB periodicity 532 can be the same, e.g., 40 ms. In some other examples, the SSB periodicity for the two SSB signals can be different.

According to some aspects, the third measurement gap configuration 115 can include a reporting period for generating a first report result about BWP 111 of carrier 106, and generating a second report result about the carrier including frequency layer 108. UE 101 can generate the first report result during the reporting period for the SSB signal at BWP 111, and further generate the second report result during the reporting period for the SSB signal at frequency layer 108. The first report result and the second report result are generated based on various measurements of the SSB signals performed during measurement gaps configured by the third measurement gap configuration 115.

At a measurement gap MG1 after a first time instance T1, UE 101 can perform a measurement 501 at the SSB signal at frequency layer 108. After repetition period 511, which is 40 ms, UE 101 can perform a measurement 502 on the SSB signal at BWP 111. Afterwards, at a second time instance T2, UE 101 can switch from BWP 111 to BWP 113. At a measurement gap MG3 after the BWP switching at time instance T2, UE 101 can measure a sample 503 on the SSB signal at BWP 111. Afterwards, UE 101 has to wait for a repetition period 521, which is 80 ms. During the repetition period 521, the SSB signal at BWP 111 can have a SSB sample 541, and the SSB signal at frequency layer 108 can have a SSB sample 542. However, since UE 101 is operating at BWP 113, and not in a measurement gap, SSB sample 541 and SSB sample 542 cannot be measured. At a measurement gap MG4, which is 80 ms after the measurement gap MG3. UE 101 can measure a sample 504 on the SSB signal at frequency layer 108. As a result, after the BWP switching at time instance T2, UE 101 can perform a set of measurements on the SSB signal at frequency layer 108, which includes the SSB sample 504. In addition, UE 101 can perform a set of measurements on the SSB signal at BWP 111, which includes the SSB sample 503.

According to some aspects, at time instance T3, UE 101 can perform another BWP switching to switch from BWP 113 to BWP 111 as the active BWP. Accordingly, the third measurement gap configuration 115 can have a repetition period 513, which is the same as the repetition period 511 for BWP 111, e.g., 40 ms. Similarly, at measurement gap MG5, UE 101 can perform a measurement on the SSB signal at frequency layer 108 to obtain SSB sample 505. In addition, UE 101 can perform a measurement on the SSB signal at BWP 111 to obtain SSB sample 506. SSB sample 506 can be measured without UE 101 being in a measurement gap, since SSB sample 506 is measured when UE is in the active BWP.

According to some aspects, UE 101 can generate a first report result during the reporting period from the time instance T1 to the time instance T4 for the SSB signal at BWP 111. The first report result is generated based on the SSB sample 502, SSB sample 503, and SSB sample 506. Similarly, UE 101 can generate a second report result during the reporting period from the time instance T1 to the time instance T4 for the SSB signal at frequency layer 108. The second report result is generated based on the SSB sample 501, SSB sample 504, and SSB sample 505.

Figure 6:
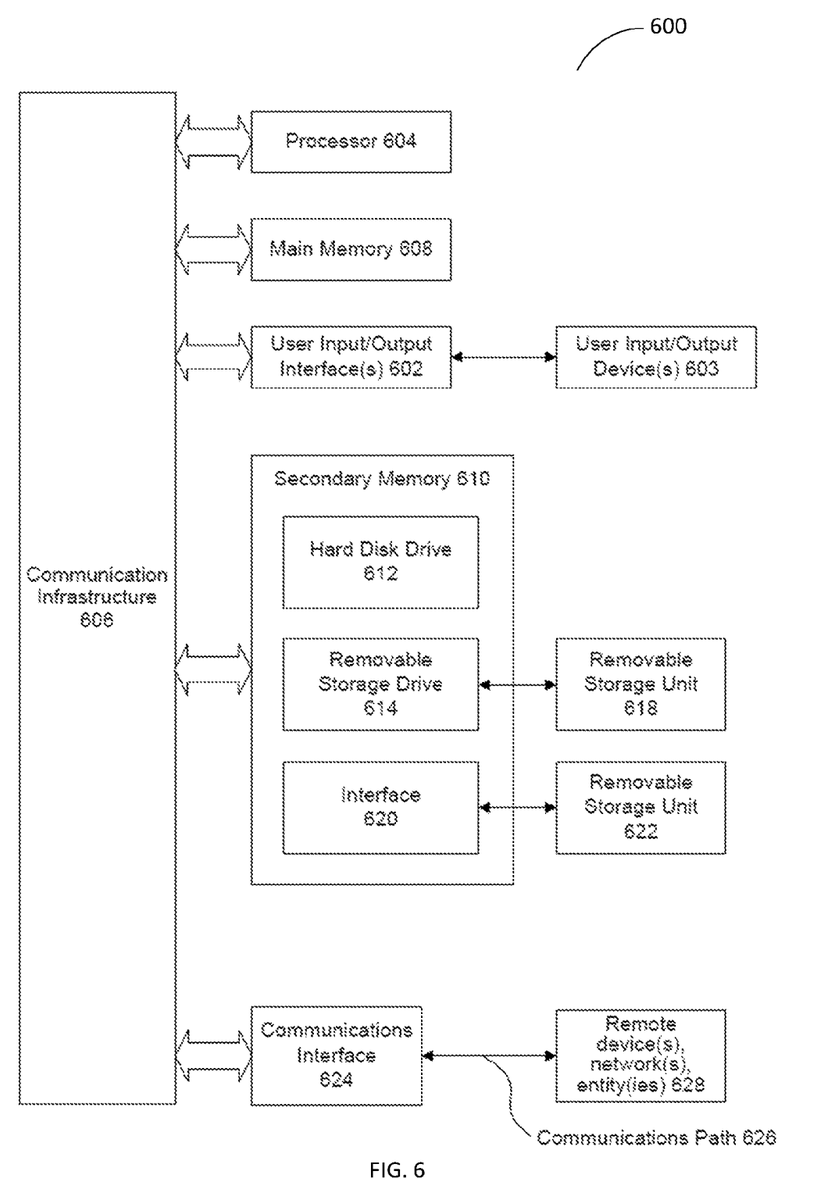
FIG. 6 is an example computer system for implementing some aspects or portion(s) thereof of the disclosure provided herein.

Various aspects can be implemented, for example, using one or more computer systems, such as computer system 600 shown in FIG. 6. Computer system 600 can be any computer capable of performing the functions described herein such as UE 101, base station 103, or base station 105 as shown in FIG. 1 and FIG. 2. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 608, the removable storage unit 618, the removable storage unit 622 can store instructions that, when executed by processor 604, cause processor 604 to perform operations for a UE or a base station, e.g., UE 101, base station 103, or base station 105 as shown in FIG. 1 and FIG. 2. In some examples, the operations include those operations illustrated and described in FIGS. 3-4.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626. Operations of the communication interface 624 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

What is claimed is:

1. A user equipment (UE), comprising:
a transceiver configured to wirelessly communicate with a base station; and
a processor communicatively coupled to the transceiver and configured to:
determine a first measurement gap configuration for a first bandwidth part (BWP) of a first frequency layer of a carrier supported by a cell that serves the UE and the base station, and a second measurement gap configuration for a second BWP of a second frequency layer of the carrier, wherein the carrier includes both the first BWP and the second BWP for communication between the UE and the base station;
determine a third measurement gap configuration for the first BWP and the second BWP, based on the first measurement gap configuration and the second measurement gap configuration, wherein the third measurement gap configuration includes a reporting period for generating a report result about the carrier, wherein the first measurement gap configuration includes a first measurement gap repetition period for the first BWP, the second measurement gap configuration includes a second measurement gap repetition period for the second BWP, and the third measurement gap configuration comprises a third measurement gap repetition period that is selected as a longer measurement gap repetition period of the first measurement gap repetition period and the second measurement gap repetition period;

perform a first set of measurements on a reference signal operating in the first BWP based on the third measurement gap configuration starting from a first time instance;

switch from the first BWP to the second BWP at a second time instance that occurs after the first time instance;

perform a second set of measurements on the reference signal during measurement gaps configured based on the third measurement gap configuration for the second BWP;

generate the report result based on a third set of measurements performed during the reporting period, wherein the third set of measurements includes at least the second set of measurements; and transmit the report result to the base station.

2. The UE of claim 1, wherein the reporting period starts from the first time instance, and the third set of measurements includes the first set of measurements on the reference signal; or the reporting period starts from the second time instance, and the report result is generated without the first set of measurements.

3. The UE of claim 2, wherein to generate the report result, the processor is configured to generate the report result based on an average value of the third set of measurements performed during the reporting period.

4. The UE of claim 1, wherein the third measurement gap configuration for the first BWP is same as the first measurement gap configuration, and the third measurement gap configuration for the second BWP is same as the second measurement gap configuration.

5. The UE of claim 1, wherein the third measurement gap configuration includes the third measurement gap repetition period for the first BWP and the second BWP.

6. The UE of claim 1, wherein the first frequency layer is an active frequency layer, and the first set of measurements on the reference signal at the first BWP is measured without being at a measurement gap.

7. The UE of claim 1, wherein switching from the first BWP to the second BWP is triggered by a downlink control information (DCI), a radio resource control (RRC) signaling, an inactivity timer expiration, or a medium access control (MAC) entity upon initiation of random access procedure.

8. The UE of claim 1, wherein the first BWP or the second BWP is an initial BWP, a first active BWP, a default BWP, or a dedicated BWP.

9. The UE of claim 1, wherein the reference signal is a synchronizations block (SSB) including Synchronization Signal based Reference Signal Received Power (SS-RSRP), Synchronization Signal based Reference Signal Received Quality (SS-RSRQ), Synchronization Signal based Signal to Noise and Interference Ratio (SS-SINR), Synchronization Signal based Signal to Noise and Interference Ratio (SS-SINR), or Received (linear) average power of resource elements that carry NR SSB signals and channels (SSB_RP).

10. The UE of claim 1, wherein the cell is a primary cell, a secondary cell, or a primary secondary cell.

11. The UE of claim 1, wherein the reference signal is a first reference signal, the carrier is a first carrier, the report result is a first report result, and the processor is further configured to:

perform a fourth set of measurements on a second reference signal at a third frequency layer of a second carrier during measurement gaps configured according to the third measurement gap configuration for the first BWP before switching from the first BWP to the second BWP, wherein the third measurement gap configuration includes the reporting period for generating the first report result about the first carrier, and generating a second report result about the second carrier;

perform a fifth set of measurements on the second reference signal at the third frequency layer of the second carrier during measurement gaps configured according to the third measurement gap configuration for the second BWP after switching from the first BWP to the second BWP; and generate the second report result based on the fourth set of measurements and the fifth set of measurements for the second carrier.

12. The UE of claim 1, wherein the first measurement gap repetition period, the second measurement gap repetition period, and the third measurement gap repetition period is 5 ms, 10 ms, 20 ms, 40 ms, 80 ms, or 160 ms.

13. The UE of claim 1, wherein the processor is further configured to receive the third measurement gap configuration from the base station, and determine the third measurement gap configuration based on the received third measurement gap configuration.

14. A method for a user equipment (UE), comprising:

determining a first measurement gap configuration for a first bandwidth part (BWP) of a first frequency layer of a carrier over a cell that serves the UE and a base station, and a second measurement gap configuration for a second BWP of a second frequency layer of the carrier over the cell, wherein the carrier includes both the first BWP and the second BWP for communication between the UE and the base station;

determining a third measurement gap configuration for the first BWP and the second BWP, based on the first measurement gap configuration and the second measurement gap configuration, wherein the third measurement gap configuration includes a reporting period for generating a report result about the carrier over the cell to be sent to the base station, wherein the first measurement gap configuration includes a first measurement gap repetition period for the first BWP, the second measurement gap configuration includes a second measurement gap repetition period for the second BWP, and the third measurement gap configuration comprises a third measurement gap repetition period that is selected as a longer measurement gap repetition period of the first measurement gap repetition period and the second measurement gap repetition period;

performing a first set of measurements on a reference signal at the first BWP based on the third measurement gap configuration starting from a first time instance;

switching from the first BWP to the second BWP at a second time instance after the first time instance;

performing a second set of measurements on the reference signal during measurement gaps configured according to the third measurement gap configuration for the second BWP;

generating the report result based on a third set of measurements performed during the reporting period, wherein the third set of measurements includes at least the second set of measurements; and transmitting the report result to the base station.

15. The method of claim 14, wherein the reporting period starts from the first time instance, and the third set of measurements includes the first set of measurements on the reference signal; or the reporting period starts from the second time instance, and the report result is generated without the first set of measurements.

16. The method of claim 15, wherein to generate the report result, a processor is configured to generate the report result based on an average value of the third set of measurements performed during the reporting period.

17. The method of claim 14, wherein the third measurement gap configuration for the first BWP is same as the first measurement gap configuration, and the third measurement gap configuration for the second BWP is same as the second measurement gap configuration.

18. The method of claim 14, wherein the third measurement gap configuration includes the third measurement gap repetition period for the first BWP and the second BWP.

19. A non-transitory computer-readable medium storing instructions that, when executed by a processor of a user equipment (UE), cause the UE to perform operations, the operations comprising:

determining a first measurement gap configuration for a first bandwidth part (BWP) of a first frequency layer of a carrier over a cell that serves the UE and a base station, and a second measurement gap configuration for a second BWP of a second frequency layer of the carrier over the cell, wherein the carrier includes both the first BWP and the second BWP for communication between the UE and the base station;

determining a third measurement gap configuration for the first BWP and the second BWP, based on the first measurement gap configuration and the second measurement gap configuration, wherein the third measurement gap configuration includes a reporting period for generating a report result about the carrier over the cell to be sent to the base station, wherein the first measurement gap configuration includes a first measurement gap repetition period for the first BWP, the second measurement gap configuration includes a second measurement gap repetition period for the second BWP, and the third measurement gap configuration comprises a third measurement gap repetition period that is selected as a longer measurement gap repetition period of the first measurement gap repetition period and the second measurement gap repetition period;

performing a first set of measurements on a reference signal at the first BWP based on the third measurement gap configuration starting from a first time instance;

switching from the first BWP to the second BWP at a second time instance after the first time instance;

performing a second set of measurements on the reference signal during measurement gaps configured according to the third measurement gap configuration for the second BWP;

generating the report result based on a third set of measurements performed during the reporting period, wherein the third set of measurements includes at least the second set of measurements; and transmitting the report result to the base station.

20. The non-transitory computer-readable medium of claim 19, wherein the reporting period starts from the first time instance, and the third set of measurements includes the first set of measurements on the reference signal; or the reporting period starts from the second time instance, and the report result is generated without the first set of measurements.

* * * * *